G. W. Serrin,
Cotton Press.
N°77,108.    Patented Apr. 21, 1868.
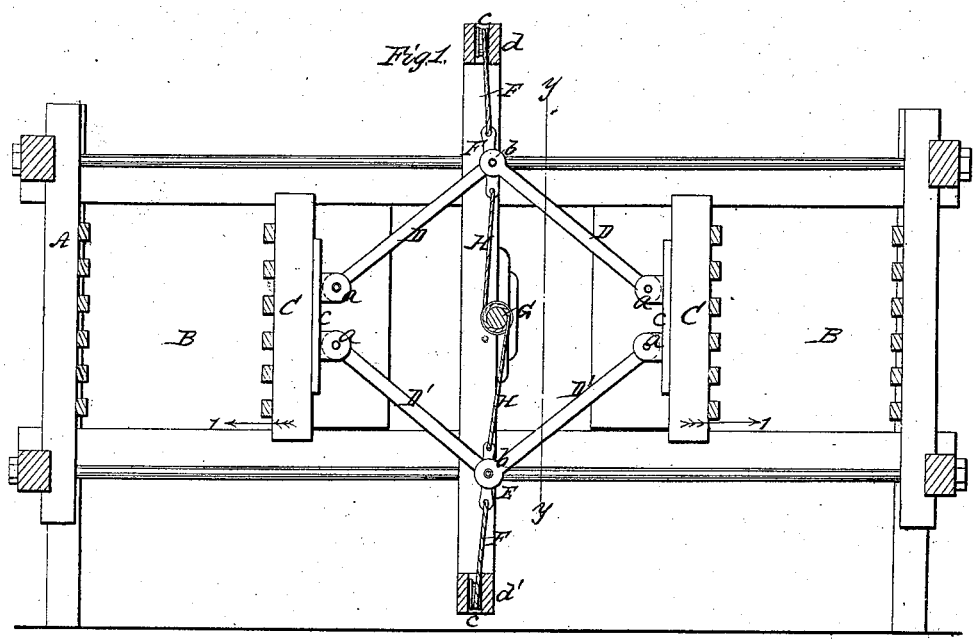
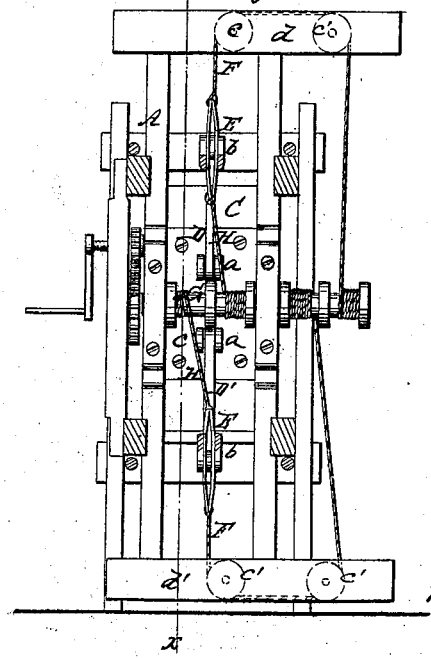
Witnesses.
W. C. Ashketter
Wm. A. Morgan
Inventor
Geo. W. Serrin
per Munn & Co.
Attorneys

United States Patent Office.

GEORGE W. SERRIN, OF MEMPHIS, TENNESSEE.

Letters Patent No. 77,108, dated April 21, 1868.

IMPROVED BALING-PRESS.

The Schedule referred to in these Letters Patent and making part of the same.

TO ALL WHOM IT MAY CONCERN:

Be it known that I, GEORGE W. SERRIN, of Memphis, in the county of Shelby, and State of Tennessee, have invented a new and improved Baling-Press; and I do hereby declare that the following is a full, clear, and exact description thereof, which will enable those skilled in the art to make and use the same, reference being had to the accompanying drawings, forming part of this specification.

This invention relates to certain improvements in baling-presses, and consists in suspending the inner ends or joints of the toggle-levers operating platens in opposite directions, from cords or chains, whereby the pressure upon the bales in the press shall be uniform without regard to their relative sizes.

In all presses having two platens, heretofore constructed, the inner joints of the toggle-levers have been guided between two bars or other fixed guides, by means of their pivoting-pins or shafts, in a line at right angles to the line of movement of the platens.

The guides being fixed or stationary, always caused the pivoting-pins or shafts to travel in the same plane without variation, and therefore destroyed the efficiency of the press, from the fact that where the bales to be pressed were unequal in size, the larger bale received the greatest amount of pressure, leaving the smaller bale loose and unpressed.

By my invention this difficulty is avoided, as the suspended points of the toggle-levers are made flexible, distributing the force derived from their operation equally throughout each platen, whereby a large and small bale may be formed under the same degree of pressure.

My invention further consists in retracting the platens after pressing the bales by the same cords which are employed to force the platens apart in the operation of pressing. In the accompanying sheet of drawings—

Figure 1 is a side sectional view of my invention, taken in the line $x\,x$, fig. 2.

Figure 2, a transverse vertical section of the same, taken in the line $y\,y$, fig. 1.

Similar letters of reference indicate corresponding parts.

A represents the framing of the press, which may be constructed of wood; and B B represent the press-boxes, in which the followers or platens C work.

To the inner side of each follower or platen, C, there are attached, by joints $a\,a$, the levers D D'. These levers D D D' D' are connected at their inner ends by joints $b\,b$, and it will be seen, by referring to fig. 1, that they comprise a double toggle. These toggles may be constructed of metal or wood. If of the latter material, the joints should be of metal, constructed in any strong and durable manner, the joints which connect the levers to the followers or platens being attached to the latter by cast-iron saddles, $c$.

The pintles of the joints $b\,b$, at the inner ends of the levers, have each a bar, E, fitted loosely thereon. These bars are perforated at each end, and to the outer end of each bar a cord or chain, F, is attached.

The upper cord or chain F passes over pulleys, $c\,c$, in a cross-piece, $d$, on the upper part of the framing; and the lower cord or chain F passes under similar pulleys, $c'\,c'$, in a cross-piece, $d'$, at the lower part of the framing, (see fig. 2.)

The two cords or chains F F are attached to a shaft, G, fitted transversely in the framing between the two pairs of toggles, the two cords or chains winding upon the shaft in opposite directions.

The inner ends of the bars E have each a cord or chain, H, attached, which are connected to the shaft G, so as to wind upon it in opposite directions.

The shaft G is rotated by any convenient or desired power; and when rotated in one direction, so as to cause the cords or chains H H to be wound upon it, the joints $b\,b$, at the inner ends of the levers D D D' D', will be drawn towards each other, and the followers or platens C C forced or moved outward, as indicated by the arrows 1, and the substance or material in the press-boxes B B will be compressed.

When the shaft G is rotated in the opposite direction, the cords or chains F F will draw apart the joints $b\,b$ of the levers D D D' D', and the followers or platens C C will be drawn back towards each other, the cords or chains H H being unwound from shaft G as F F are wound upon it, and vice versa.

By this simple arrangement, a very powerful and compact baling-press is obtained, and one which may be constructed at a very moderate cost.

I claim as new, and desire to secure by Letters Patent—

1. The toggle-levers, when suspended upon the cords or chains F H, forming flexible suspension-points, whereby bales of unequal size are pressed with equal force by the platens C, substantially as herein set forth.

2. The arrangement of the cords F H, pulleys $e$ $e'$, and windlass G, as herein described, for the purpose specified.

GEORGE W. SERRIN.

Witnesses:
A. H. DE CLERCQ,
J. H. McGUIRE.